Patented Sept. 3, 1935

2,013,099

UNITED STATES PATENT OFFICE 2,013,099

ORGANIC COLORING MATERIAL COMPRISING AN AZO COMPOUND AND NATURAL GUMS AND BALSAMS AS A SUBSTRATUM

Wayne N. Headley, Livingston, and Alfred Siegel, Hillside, N. J., assignors to Krebs Pigment & Color Corporation, Newark, N. J., a corporation of Delaware No Drawing. Application October 16, 1933, Serial No. 693,826

10 Claims. (Cl. 134—58.5)

The present invention comprises novel azo lakes and pigments in which the azo coloring compound is combined with a substratum which is a derivative of natural gums and balsams obtained from plants of the genus Angiospermae, and processes of making the same.

Azo lakes and pigments are generally prepared by combining an azo coloring compound with a substratum which is commonly an inorganic, metallic oxide or hydroxide, such as aluminum hydroxide. It is also well known that resins derived from plants of the genus Gymospermae, i. e. conifers, can be used to form substrata for azo pigments and lakes. (See for instance U. S. Patent Re-18,590 to E. R. Allen and A. Siegel, the latter being one of the inventors of the present improvement.) These resins, such as colophony, consist to a large and sometimes predemoniating extent of terpenic acids of which abietic acid is the most prominent one, as a matter of fact rosin of colophony consists of over 80% of abietic acid, and the property of rosin and rosinates to act as substrata for azo lakes and pigments was generally attributed to their content of abietic acid.

We have found that natural gums and balsams which are substantially free from terpenic acids and particularly free from abietic acid, can also act as substrata for azo lakes or pigments.

These natural gums and balsams are exudations of plants belonging to another genus than the conifers, they belong to the genus of Angiospermae: the gums and balsams from Angiospermae are composed of various organic acids, such as complex aromatic acids and other hydroxyl compounds or their derivatives, which can react with alkaline substances to form soap-like substances which, in the case of alkali metal soaps, are generally water soluble but less water soluble when the base of the soap is an alkaline earth or heavy metal.

Among the natural gums and waxes derived from Angiospermae, which are useful in our invention we may cite the following:

Gamboge, a gum resin from plants of the Guttiferae family which belongs to the order Cistiflorae and the genus of Angiospermae.

Liquid styrax, stroax, etc. These are balsams contained particularly in the wood and inner bark of Liquidambar orient. and other Hamamelidiaceae, of the order of Saxifraginae and genus Angiospermae.

Guaiacum, which is a resin from the wood of Guaiacum off. of the order of Terebinthinae and genus of Angiospermae. The order of Terebinthinae produces also other gums, or balsams useful in our invention, for instance, Mastic, a concrete resinous exudation from Pistacia lentiscus, an anacardiaceae of the above order.

Myrrh, a gum exudation from Balsamea myrrha and other trees from the Burseraceae family and the above order.

Benzoin-gum or storax-bezoin obtained from the trees of the Styraceae family, order of Diospyrinae and genus of Angiospermae.

Ammoniacum, a resinous gum obtained from Dorema ammoniacum, an Umbellifereae of the genus Angiospermae.

Galbanum, a gum resin from Ferula galbaniflua, an Umbellifereae of the genus Angiospermae.

The use of these natural gums and balsams as substrata according to our invention involves the formation of water soluble soaps therefrom, as for instance by the action of caustic alkalis thereon, and a subsequent precipitation or partial precipitation of an alkaline earth metal or heavy metal soap.

The process of our invention comprising heating, for instance to the boiling temperature, an aqueous suspension of an insoluble azo coloring compound or salt in the presence of a substantial amount of an insoluble or partially soluble soap of a natural gum or balsam derived from plants of the genus Angiospermae.

This heating results in the development of a lake or pigment whereby the azo compound combines in a physical or chemical manner with the soap and other changes take place in the azo compound and the full tinctorial values of the lake in respect to improved shade and strength are obtained.

The suspension of the insoluble azo coloring compound and soap of the natural gums and balsams can be prepared in any desired manner.

We can, for instance, add a soluble alkali metal gum or balsam soap to either the diazo compound or to the coupling compound, effect the formation of the azo coloring compound and then add an alkaline earth or heavy metal salt to the reaction mixture whereby the insoluble azo compound and the insoluble soap are precipitated. The so-obtained suspension can then be directly heated to develop the lake, or we can purify the mixture by separating it from the mother liquor and forming a new aqueous slurry therefrom. We can also prepare separately the more or less water soluble azo coloring compound and add the soluble soap thereto, jointly precipitate the two and then develop or we can prepare separately the insoluble azo compound and the insoluble soap, form an aqueous slurry therefrom and then develop or we can prepare the aqueous suspension of the two insoluble reactants in any other manner as will be obvious to any one skilled in this art.

The insoluble azo coloring salts are prepared in the same manner as the insoluble gum and balsam soaps, namely by acting upon the more or less soluble alkali metal salts of the azo compounds with salts of the alkaline earth and heavy metals such as calcium, barium, aluminum, zinc, lead, etc. We can also use azo compounds which are obtained directly in insoluble form in the coupling reaction.

The development can be carried out in a neutral or alkaline medium, similar results being obtained, though in many instances we prefer to develop in an alkaline medium. It is also in many instances preferred to add a dispersing agent to the development mixture and for this purpose we found the following quite useful: soluble fatty acid soaps, sulfonated vegetable and animal oils, such as Turkey red oil, sulfonated castor oil, sulfonated cotton seed oil, sulfonated fish oil, etc.

Our invention is applicable to various azo dyestuffs of the following three types which are capable of being transformed into pigments.

*Mono-azo monosulfonic acids.*—The sulfonic acid group is usually and preferably located in the first, or diazo component. These toners are more or less soluble in the form of their free acids or alkali metal salts and are rendered insoluble by treatment with an alkaline earth or heavy metal salt. Instances of such combinations are the compounds formed by coupling
1. Diazotized 2-naphthylamine 1-sulfonic acid with beta naphthol (Lithol red, Colour Index No. 189).
2. Diazotized para-nitraniline ortho-sulfonic acid with beta naphthol. (Lake red P, Colour Index No. 158.)
3. Diazotized 2-naphthylamine 1-sulfonic acid with salicylic acid.
4. Diazotized para-toluidine meta-sulfonic acid with the anilide of beta-oxynaphthoic acid.

*Mono-azo monocarboxylic acids.*—The carboxylic acid group may be in either component and the component not containing the carboxylic group may or may not contain a sulfonic acid group. These toners are more or less soluble as their free acids or alkali metal salts and are rendered insoluble by treatment with an alkaline earth or heavy metal salt. For example, such toners can be formed by coupling
1. Diazotized para-toluidine meta-sulfonic acid with beta-oxynaphthoic acid (Lithol Rubine, Colour Index No. 163).
2. Diazotized para-nitro ortho-toluidine with beta-oxynaphthoic acid.
3. Diazotized anthranilic acid with beta naphthol (Lake red D, Colour Index No. 214).
4. Diazotized 2-naphthylamine 1-sulfonic acid with beta-oxynaphthoic acid. (Lake Bordeaux B, Colour Index No. 190.)

*Azo pigment dyestuffs.*—This type of toner is a substantially insoluble dyestuff produced in the coupling itself and does not contain salt-forming groups. The following illustrative cases are formed by coupling
1. Diazotized para-nitro-aniline with beta naphthol. (Para red, Colour Index No. 44.)
2. Diazotized meta-nitro para-toluidine with aceto-acetanilide (Hansa yellow G).
3. Diazotized para-nitro ortho-toluidine with beta naphthol (Pigment orange R, Colour Index No. 68).
4. Diazotized alpha-naphthylamine with beta naphthol (Autol red RL, Colour Index No. 82).

For convenience sake and to conform with commercial and industrial practice, we are using the term beta-oxynaphthoic acid herein to designate the 2.hydroxynaphthalene-3.carboxylic acid.

For the purpose of this invention and in accordance with commercial practice, a "toner" is defined as an organic pigment which may or may not contain salt-forming groups and which is not associated with a substratum or extender; and a "lake" is an organic pigment which contains a substratum or extender. In the former type of pigment the true coloring matter is produced directly in an insoluble form and can be used for various purposes as such, without the addition of a substratum; in the latter type the true coloring matter is associated intimately with a substratum, which is commonly an inorganic substance, such as alumina hydrate, blanc fixe, etc. or combinations of the same.

The choice between the two types of pigments depends largely upon the intended use, there being various essential differences in their properties, which relate to texture, dispersion, oil absorption, bulking value, and behavior in vehicles. These differences are best explained by the following illustrations.

The alkaline earth salt of the dyestuff prepared by coupling diazotized para-toluidine metasulfonic acid with beta-oxynaphthoic acid may be used as such (toner form) or may be extended with a substratum consisting of alumina hydrate and blanc fixe (lake form). For use as a rubber pigment it has been found that the lake form has definite advantages over the toner in respect to (a) greater strength for the same dyestuff content, (b) reduction of the tendency to crock, and (c) blending with other pigments. Similarly, in the application of pigments to linoleum the lake or extended type of pigment has a definite advantage because of ease of dispersion. In paints and enamels, toners are generally used for their advantages in such properties as gloss; however, in the case of the cheap para reds (so-called grinder's reds) a substratum is an aid in the grinding of the paint. In the field of printing inks, the lake form of pigment may offer an advantage over the toner form under certain conditions where texture is an important problem. On the other hand, toners show advantages from the point of view of allowing the ink-maker greater freedom in the choice of white base (extender) which he grinds into the ink; however, under certain conditions the combination of toner and white pigment ordinarily used in the ink might be replaced by a lake color which would result in simplification in the manufacture of the ink.

The present invention relates to the lakes which contain a substratum, and they can be obtained from the toner type of azo compounds as well as from the azo compounds which only by association with a substratum become a pigment, or lake, in both instances the azo compound is substantially water insoluble before developing or become so during development.

The products of the present invention combine to a certain extent the color strength and properties of a toner with the properties usually found in a lake formed with an inorganic substratum.

Small amounts of insoluble gum and balsam soap substrata in our novel lakes produce noticeable improvements in the tinctorial properties of the lakes over the straight insoluble azo compounds or lakes made from inorganic substrata. To obtain the improvements we prefer to produce lakes and pigments containing from about 5 to 30% of the gum and mastic soaps.

Our novel lakes and pigments are characterized chemically by containing as the substratum an insoluble soap of a natural gum or balsam derived from plants of the genus Angiospermae. These soaps are further characterized by their substantial freedom from abietic acid. These novel lakes have brighter and cleaner shades and improved tinctorial properties when compared with the corresponding lakes made with inorganic substrata.

The following are a few examples of some of our new lakes and pigments and how they were prepared.

It will be understood that our invention is not limited to the particular azo compounds described therein nor to the specific manipulations to which the materials are subjected prior to the development. Similar results are also obtained with other azo coloring compounds which are capable of forming lakes and pigments on development in the presence of a substratum and similar results are also obtained by using in the development other alkaline earth or heavy metal salts of the azo compound and other insoluble soaps of the gums and balsam of Angiospermae.

*Example I.*—A solution of 41.8 parts of the sodium salt of para toluidine metasulphonic acid ($CH_3:SO_3:NH_2=1:3:4$) is diazotized with 14.4 parts of nitrite of soda and 52 parts of 20° Bé. muriatic acid.

40 parts of beta oxynaphthoic acid ($OH:COOH=2:3$) are dissolved in a solution of 16.3 parts of caustic soda and 200 parts of water. To this are added 40.3 parts of soda ash in 400 parts of water. The temperature and volume of the beta oxynaphthoic acid solution is adjusted to 40° C. and 1000 parts of solution, and the above described diazo preparation is then run in whereupon the azo coupling proceeds quickly and to good completion. After stirring a short time the dyestuff is filtered.

The soda salt dye paste is then re-slurried to 16,800 parts of water at 40° C. To this are added 9.6 parts of para soap in 50 parts of water. In a separate container 32 parts of gamboge are added to a solution of 6.5 parts of caustic soda in 400 parts of water, and the solution boiled until the formation of the soluble gamboge soap is complete. This gamboge soap solution is then added to the dye solution and the temperature adjusted to 40° C. and stirred 15 minutes.

In a separate container 80 parts of calcium chloride are dissolved in 2000 parts of water and the temperature adjusted to 27° C., and into this is then run in 10 minutes the dye-soap solution. There is then added 41 parts of caustic soda in 500 parts of water and the slurry stirred for 15 minutes. The charge is then developed by heating to the boil and digested at this temperature for ½ hour, after which it is washed, filtered, and dried in the usual manner.

The yield is approximately 124 parts of pigment compared with 92 parts in a charge carried out in exactly the same way but without the gamboge. The lake pigment contains about 26% of the calcium soap of gamboge as an insoluble substratum. The covering power of this lake (determined by tinting in white) is equal to the normal product, and the lake when ground into litho varnish gives a print which has a greater cleanliness and brightness of printing tone.

*Example II.*—A solution of 41.8 parts of the sodium salt of para-toluidine metasulphonic acid ($CH_3:SO_3:NH_2=1:3:4$) is diazotized with 14.4 parts of nitrite of soda and 52 parts of muriatic acid (20° Bé.).

40 parts of beta oxynaphthoic acid ($OH:COOH=2:3$) are dissolved in a solution of 16.3 parts of caustic soda and 200 parts of water. To this are added 40.3 parts of soda ash in 400 parts of water. The temperature and volume of the beta oxynaphthoic acid solution is adjusted to 40° C. and 1000 parts of solution, and the above described diazo preparation is then run in whereupon the azo coupling proceeds quickly and to good completion. After stirring a short time the dyestuff is filtered.

The soda salt dye paste is then re-slurried to 16,800 parts of water at 40° C. To this are added 9.6 parts of para soap in 50 parts of water. In a separate container 32 parts of guaiacum are added to a solution of 13 parts of caustic soda in 400 parts of water, and the solution boiled until the formation of the soluble guaiacum soap is completed. This guaiacum soap solution is then added to the dye solution and the temperature adjusted to 40° C. and stirred 15 minutes.

In a separate container 80 parts of calcium chloride are dissolved in 2000 parts of water and the temperature adjusted to 27° C., and into this is then run in 10 minutes the dye-soap solution. There is then added 34.5 parts of caustic soda in 500 parts of water and the slurry stirred for 15 minutes. The charge is then developed by heating to the boil and digested at this temperature for ½ hour, after which it is washed, filtered, and dried in the usual manner.

The yield is approximately 116 parts of pigment compared with 92 parts in a charge carried out in exactly the same way but without the guaiacum. The lake pigment contains about 19% of the calcium soap of guaiacum as an insoluble substratum. The covering power of this lake (determined by tinting in white) is equal to the normal product, and the lake when ground into litho varnish gives a print which possesses a bright, fiery, bronze free tone.

*Example III.*—A solution of 41.8 parts of the sodium salt of paratoluidine metasulphonic acid ($CH_3:SO_3:NH_2=1:3:4$) is diazotized with 14.4 parts of nitrite of soda and 52 parts of 20° Bé. muriatic acid.

40 parts of beta oxynaphthoic acid $$(OH:COOH=2:3)$$

are dissolved in a solution of 16.3 parts of caustic soda and 200 parts of water. To this are added 40.3 parts of soda ash in 400 parts of water. The temperature and volume of the beta oxynaphthoic acid solution is adjusted to 40° C. and 1000 parts of solution, and the above described diazo preparation is then run in whereupon the azo coupling proceeds quickly and to good completion. After stirring a short time the dyestuff is filtered.

The soda salt dye paste is then re-slurried to 16,800 parts of water at 40° C. To this are added 9.6 parts of para soap in 50 parts of water. In a separate container 32 parts of liquid styrax are added to a solution of 13 parts of caustic soda in 200 parts of water, and the solution boiled until the formation of the soluble liquid styrax soap is complete. This liquid styrax soap solution is then added to the dye solution and the temperature adjusted to 40° C. and stirred 15 minutes.

In a separate container 80 parts of calcium chloride are dissolved in 2000 parts of water and the temperature adjusted to 27° C., and into this is then run in 10 minutes the dye soap solution. There is then added 34.5 parts of caustic soda in 500 parts of water and the slurry stirred for 15 minutes. The charge is then developed by heating to the boil and digested at this temperature for ½ hour, after which it is washed, filtered, and dried in the usual manner.

The yield is approximately 110 parts of pigment compared with 92 parts in a charge carried out in the same way but without the liquid styrax. The lake pigment contains about 16% of the calcium soap of liquid styrax. The lake is equal in strength to the normal product, is superior to it in richness of tone, clarity of shade, and printing tone obtained from printing inks containing it.

*Example IV.*—A solution of the sodium salt of 2-chloro 4-amino toluene 5-sulfonic acid corresponding to 44.4 parts of the free acid, is diazotized in the usual manner with 15 parts of sodium nitrite and 57 parts of muriatic acid 20° Bé. In a separate container 40 parts of beta oxynaphthoic acid (OH:COOH=2:3) and 12.3 parts of caustic soda are added to 350 parts of water and dissolved; to this is added a solution of 24 parts of soda ash in 150 parts of water and the volume of beta oxynaphthoic acid solution is adjusted to 1200 parts at 15° C. The diazo solution mentioned above is then introduced and the coupling proceeds rapidly and to good completion. After stirring one hour the dyestuff is heated to 65° C. in 15 minutes and held at 65° C. for 15 minutes. It is then filtered and re-slurried to 9200 parts at 40° C.

To a solution of 11.5 parts of caustic and 2000 parts of water is added 30 parts of liquid styrax, and the preparation boiled to complete saponification. This preparation is then run into the dye suspension described above, stirred, and 10.4 parts of acetic acid added.

The charge is then heated to the boil in 20 to 30 minutes, boiled 5 minutes, and precipitated with a solution of 120 parts of calcium chloride in 1200 parts of boiling water. After boiling to insure development, the product is washed, filtered, dried and ground in the usual manner.

The yield is approximately 99 parts of pigment compared with 90 parts in a charge carried out in exactly the same way but without the liquid styrax. The lake pigment contains about 9% of the calcium salt of liquid styrax as an insoluble substratum. The lake is equal in strength to the normal product, and when ground into litho varnish gives a cleaner, brighter, yellower printing tone.

*Example V.*—A solution of the sodium salt of 2-naphthylamine 1-sulfonic acid corresponding to 111.5 parts of the free acid, is diazotized in the usual manner with 39 parts of sodium nitrite and 204 parts of muriatic acid 20° Bé. In a separate container a solution of 80 parts of beta naphthol and 51 parts of caustic soda is prepared and made to a volume corresponding to approximately 2500 parts of water. After the temperature of this solution had been adjusted to 25° C., the diazo suspension referred to above is introduced into the beta naphthol solution. It is evident from the amounts of ingredients stated above, that the azo reaction is completed in an alkaline condition. The charge is then heated to 40° C.

Dissolve 75 parts of mastic in 250 to 350 parts of gasoline, heating if necessary, and add the resulting solution to a solution of 30 parts of caustic soda in 325 parts of water. This preparation is brought to the equivalent of approximately 1900 parts of water, and boiled to complete saponification. This preparation of mastic soap is then run into the charge of the azo dyestuff, described above the temperature and volume of the combining solutions so adjusted that the temperature of the resulting charge does not drop below 40° C.

The charge is then precipitated with a solution of 240 parts of barium chloride in 5,000 parts of water at the boil, boiled to insure development of the lake, and the product then washed, filtered, dried, and ground in the usual manner.

The yield is approximately 315 parts of dry product compared to 245 parts in a charge prepared without mastic soap. The lake contains about 22% of the barium soap of mastic as an insoluble subtsratum. The lake is of equal strength to the normal product and cleaner and yellower in shade.

*Example VI.*—A solution of 41.8 parts of the sodium salt of paratoluidine metasulphonic acid ($CH_3:SO_3:NH_2=1:3:4$) is diazotized with 14.4 parts of nitrite of soda and 52 parts of 20° Bé. muriatic acid.

40 parts of beta oxynaphthoic acid (OH:COOH=2:3)

are dissolved in a solution of 16.3 parts of caustic soda and 200 parts of water. To this are added 40.3 parts of soda ash in 400 parts of water. The temperature and volume of the beta oxynaphthoic acid solution is adjusted to 40° C. and 1000 parts of solution, and the above described diazo preparation is then run in whereupon the azo coupling proceeds quickly and to good completion. After stirring a short time the dyestuff is filtered.

The soda salt dye paste is then re-slurried to 16,800 parts of water at 40° C. To this are added 9.6 parts of para soap in 50 parts of water. In a separate container 32 parts of mastic are dissolved in 100 to 140 parts of gasoline, heating if necessary; this solution is then added to a solution of 6.5 parts of caustic soda in 400 parts of water, and the solution boiled until the formation of the soluble mastic soap is complete. This mastic soap solution is then added to the dye solution and the temperature adjusted to 40° C. and stirred 15 minutes.

In a separate container 80 parts of calcium chloride are dissolved in 2000 parts of water and the temperature adjusted to 27° C., and into this is then run in 10 minutes the dye soap solution. There is then added 41 parts of caustic soda in 500 parts of water and the slurry stirred for 15 minutes. The charge is then developed by heating to the boil and digested at this temperature for ½ hour, after which it is washed, filtered, and dried in the usual manner.

The yield is approximately 126 parts of pigment compared with 92 parts in a charge carried out in exactly the same way but without the mastic. The lake containing about 27% of the calcium soap of mastic as an insoluble substratum is equal in strength to the normal product and when ground in litho varnish gives a cleaner, brighter printing tone with a bronzy finish.

*Example VII.*—69 parts of para-nitro-aniline are dissolved in 60 parts of muriatic acid (100%) and 300 parts of water at 80–90° C., and the solution is then allowed to flow in a fine stream onto 625 parts of ice and water with good stirring. The resulting suspension is then diazotized in the usual manner with 37.5 parts of sodium nitrite, after stirring approximately 20 minutes, the diazo preparation is partially neutralized with 25 parts of whiting and the stirring continued for 15 minutes.

To a solution of 7 parts of caustic soda in 500 parts of water, add 37.5 parts of ammoniacum and boil ½ hour. This solution is then added to a solution of 25 parts of barium chloride in 1225 parts of water at the boil and boiled fifteen minutes. Previously, to a solution of 26 parts of caustic soda and 26 parts of soda ash (98%) in 400 parts of water is added 71.5 parts of beta-naphthol and the mixture heated until a clear solution is obtained. To this solution is also added a mixture of 6.5 parts of para soap in 65 parts of water, and the resulting solution is added in a fine stream to the ammoniacum soap. The temperature and volume of the resulting mixture is adjusted to 15° C. and 2900 parts of solution, and the above diazo solution is run in whereupon the azo coupling proceeds quickly and smoothly to completion. After stirring a short time the dyestuff is brought rapidly to the boil and boiled 5 minutes, the product is then flooded, washed and dried in the usual manner.

The yield is approximately 180 parts of pigment compared with 160 parts in a charge carried out in exactly the same way but without ammoniacum. The pigment contains about 7% of the barium soap of ammoniacum.

The new lake pigment has good strength, a low bronze printing tone, and good texture.

*Example VIII.*—A solution of para-nitro-ortho-toluidine is prepared by dissolving 77.5 parts of para-nitro-toluidine in a mixture of 55 parts of muriatic acid (100%) and 750 parts of water at 60° C. This solution is then poured onto ice and adjusted to 0° C., the resulting solution or suspension is diazotized in the usual manner with 37.5 parts of sodium nitrite.

145 parts of the anilide of beta oxynaphthoic acid ($OH:CONHC_6H_5=2:3$) are dissolved in a solution of 43 parts of caustic soda and 500 parts of water. To this are added 70 parts of sodium acetate, and after stirring to solution; 15 parts of para soap in 125 parts of water; and then 37.5 parts of liquid styrax dissolved at the boil in a solution of 6 parts of caustic soda and 250 parts of water and boiled until saponification is complete. The resulting solution is adjusted to 5000 parts of solution at 4° C., and the above diazo preparation run in rapidly. This is followed by a solution of 30.5 parts of caustic soda in 375 parts of water, and the entire mixture is brought to 40° C. in 20 minutes, at which temperature the azo coupling proceeds rapidly to completion. After stirring a few minutes the dyestuff is made to 40,000 parts of solution at 27° C. and acidified with 12.5 parts of glacial acetic acid. After this is added in 10 minutes a solution of 75 parts of calcium chloride in 500 parts of water. There is then added 20.5 parts of caustic soda in 250 parts of water and the slurry stirred for 15 minutes. The charge is then developed by heating to the boil and digested at this temperature for ½ hour, after which it is washed, filtered, and dried in the usual manner.

The yield is approximately 235 parts of pigment compared with 218 parts in a charge carried out in exactly the same way but without the liquid styrax. The pigment contains about 7% of calcium soap of liquid styrax. The lake pigment is of excellent strength, has a clean bright printing tone, and good texture.

*Example IX.*—A mixture of 76 parts of meta-nitro-para-toluidine and 825 parts of water is pulped until a creamy paste is obtained. This paste is diazotized with 38 parts of sodium nitrite and 54 parts of muriatic acid (100%) in the usual manner and the diazo preparation is allowed to stir for 1½ hours.

In a separate container a solution of 79 parts of beta naphthol and 24 parts of caustic soda is prepared and made to a volume corresponding to approximately 2500 parts of solution at 38° C. To this is added: a mixture of 4.7 parts of para soap in 60 parts of water, a solution of 85 parts of sodium acetate in 500 parts of water, a solution of 56 parts of sodium bicarbonate in 625 parts of water, and finally, a solution made by boiling 37.5 parts of liquid styrax in a solution of 5 parts of caustic soda and 250 parts of water until saponification is complete. The resulting solution is adjusted to 5600 parts of solution at 35° C. and the above diazo preparation is added in 1 hour, the azo coupling proceeds rapidly to completion. The dyestuff is stirred for ½ hour, after which it is developed by raising to the boil, and after 5 minutes boiling it is struck with a solution of 50 parts of calcium chloride in 1500 parts of water and boiled 10 minutes. The product is then washed, filtered and dried in the usual manner.

The yield is approximately 186 parts of pigment compared to 155 parts in a charge prepared without the liquid styrax. The pigment contains about 17% of the calcium soap of liquid styrax. The tinctorial properties are those of a lake, with the improvement of an increase in blueness of tint.

*Example X.*—A mixture of 68.5 parts of anthranilic acid and 1125 parts of water are stirred to a thin paste, and 22.5 parts of muriatic acid (100%) are added. The resulting solution is iced to 3° and diazotized in the usual manner with 37 parts of sodium nitrite.

99 parts of beta oxynaphthoic acid $$(OH:COOH=2:3)$$

are dissolved in a solution of 46 parts of caustic soda and 500 parts of water. The temperature and volume of the beta oxynaphthoic acid solution is adjusted to 15° C. and 3000 parts of solution, and the above described diazo preparation is then run in whereupon the azo coupling proceeds to completion. The dye slurry is made to 13,000 parts of solution at 40° C. and to this is added a solution prepared by adding 75 parts of gamboge to a solution of 14 parts of caustic soda in 1500 parts of water and boiling for ½ hour. After stirring a short time the dye slurry is precipitated by running it into a boiling solution of 200 parts of calcium chloride and 5000 parts of water, boiled 20 minutes to insure development, and then washed, filtered, and dried in the usual manner.

The yield is approximately 243 parts of the dry product compared to 180 parts in a charge prepared without gamboge. The lake pigment contains about 26% of the calcium soap of gamboge, and possesses the usual tinctorial properties with a clean, yellow printing tone.

*Example XI.*—A mixture of 68.5 parts of anthranilic acid and 1125 parts of water are stirred to a thin paste, and 22.5 parts of muriatic acid (100%) are added, the resulting solution is iced to 3° C. and diazotized in the usual manner with 37 parts of sodium nitrite.

99 parts of beta oxynaphthoic acid (OH:COOH=2.3)

are dissolved in a solution of 46 parts of caustic soda and 500 parts of water. The temperature and volume of the beta oxynaphthoic acid solution is adjusted to 15° C. and 3000 parts of solution, and the above described diazo preparation is then run in whereupon the azo coupling proceeds to completion. The dye slurry is made to 13,000 parts of solution at 40° C. and to this is added a solution prepared by adding 7 parts of liquid styrax to a solution of 20 parts of caustic soda in 500 parts of water and boiling for ½ hour. After stirring a short time the dye slurry is precipitated by running it into a boiling solution of 200 parts of calcium chloride and 5000 parts of water, boiled 20 minutes to insure development, and then washed, filtered, and dried in the usual manner.

The yield is approximately 225 parts of dry product compared to 180 parts in a charge prepared without the liquid styrax. The lake pigment contains about 20% of the calcium soap of liquid styrax, and possesses in addition to the usual properties of a lake, a clean, bright yellow printing tone.

*Example XII.*—A solution of para-nitro-ortho-toluidine is prepared by dissolving 77.5 parts of para-nitro-ortho-toluidine in a mixture of 55 parts of muriatic acid (100%) and 750 parts of water at 60° C. This solution is then poured into ice and adjusted to 0° C., the resulting solution or suspension is diazotized in the usual manner with 37.5 parts of sodium nitrite.

104 parts of beta oxynaphthoic acid (OH:COOH=2.3)

are dissolved in a solution of 23 parts of caustic soda and 1000 parts of water. An additional 59 parts of caustic soda dissolved in 700 parts of water are added and the volume and temperature adjusted to 2500 parts of solution at 20° Bé. The above described diazo preparation is then run in whereupon the azo coupling proceeds to completion. The dye slurry is made to 13,000 parts of solution at 40° C. and to this is added a solution prepared by dissolving 75 parts of ammoniacum in a solution of 12 parts of caustic soda in 1000 parts of water at the boil and boiling for ½ hour. After stirring a short time the dye slurry is precipitated by running it into a boiling solution of 200 parts of calcium chloride and 5000 parts of water, boiled 20 minutes to insure development, and then washed, filtered and dried in the usual manner.

The yield is approximately 250 parts of dry product compared to 205 parts in a charge prepared without the ammoniacum. The lake pigment contains 18% of the calcium soap of ammoniacum, and possesses in addition the usual tinctorial properties of a lake, a blue shade.

*Example XIII.*—A solution of para-nitro-ortho-toluidine is prepared by dissolving 77.5 parts of para-nitro-ortho-toluidine in a mixture of 55 parts of muriatic acid (100%) and 750 parts of water at 60° C. This solution is then poured onto ice and adjusted to 0° C., the resulting solution or suspension is diazotized in the usual manner with 37.5 parts of sodium nitrite.

104 parts of beta oxynaphthoic acid (OH:COOH=2.3)

are dissolved in a solution of 23 parts of caustic soda and 1000 parts of water. An addition 59 parts of caustic soda dissolved in 700 parts of water are added and the volume and temperature adjusted to 2500 parts of solution at 20° C. The above described diazo preparation is then run in whereupon the azo coupling proceeds to completion. The dye slurry is made to 13,000 parts of solution at 40° C. and to this is added a solution prepared by dissolving 75 parts of liquid styrax in a solution of 12 parts of caustic soda in 500 parts of water at the boil and boiling for ½ hour. After stirring a short time the dye slurry is precipitated by running it into a boiling solution of 200 parts of calcium chloride and 5000 parts of water, boiled 20 minutes to insure development, and then washed, filtered and dried in the usual manner.

The yield is approximately 230 parts of dry product compared to 205 parts in a charge prepared without the liquid styrax. The lake pigment contains 11% of the calcium soap of liquid styrax, and has a clean, bright, yellow printing tone, good strength, and good texture.

We claim:

1. In a process of preparing azo lakes and pigments the step of developing an aqueous suspension of an insoluble azo coloring compound in the presence of a soap of a natural gum, or balsam, derived from plants of the genus Angiospermae.

2. In a process of preparing azo lakes and pigments the step of developing an aqueous suspension of an insoluble azo coloring compound in the presence of a soap of a natural gum, or balsam, derived from plants of the genus Angiospermae.

3. In a process of preparing azo lakes and pigments the step of developing an aqueous suspension of an insoluble salt of an azo coloring compound in the presence of a soap of a natural gum, or balsam, derived from plants of the genus Angiospermae.

4. A lake or pigment comprising an insoluble azo coloring compound combined with a substratum comprising a soap of a gum, or balsam, derived from plants of the genus Angiospermae.

5. A lake or pigment comprising an insoluble coloring compound combined with a substratum comprising a soap of a gum, or balsam, derived from plants of the genus Angiospermae.

6. A lake or pigment comprising an insoluble salt of an azo coloring compound combined with a substratum comprising a soap of gamboge.

7. A lake or pigment comprising an insoluble salt of an azo coloring compound combined with a substratum comprising a soap of ammoniacum.

8. A lake or pigment comprising an insoluble salt of an azo coloring compound combined with a substratum comprising a soap of mastic.

9. A lake or pigment comprising an alkaline earth metal salt of the azo compound obtained by coupling diazotized 2-naphthylamine 1-sulfonic acid with beta naphthol, combined with a mastic soap.

10. A lake or pigment comprising an alkaline earth metal salt of the azo compound obtained by coupling diazotized para-nitro-ortho-toluidine with beta oxynaphthoic acid combined with a soap of ammoniacum.

WAYNE N. HEADLEY.
ALFRED SIEGEL.